Patented Feb. 17, 1953

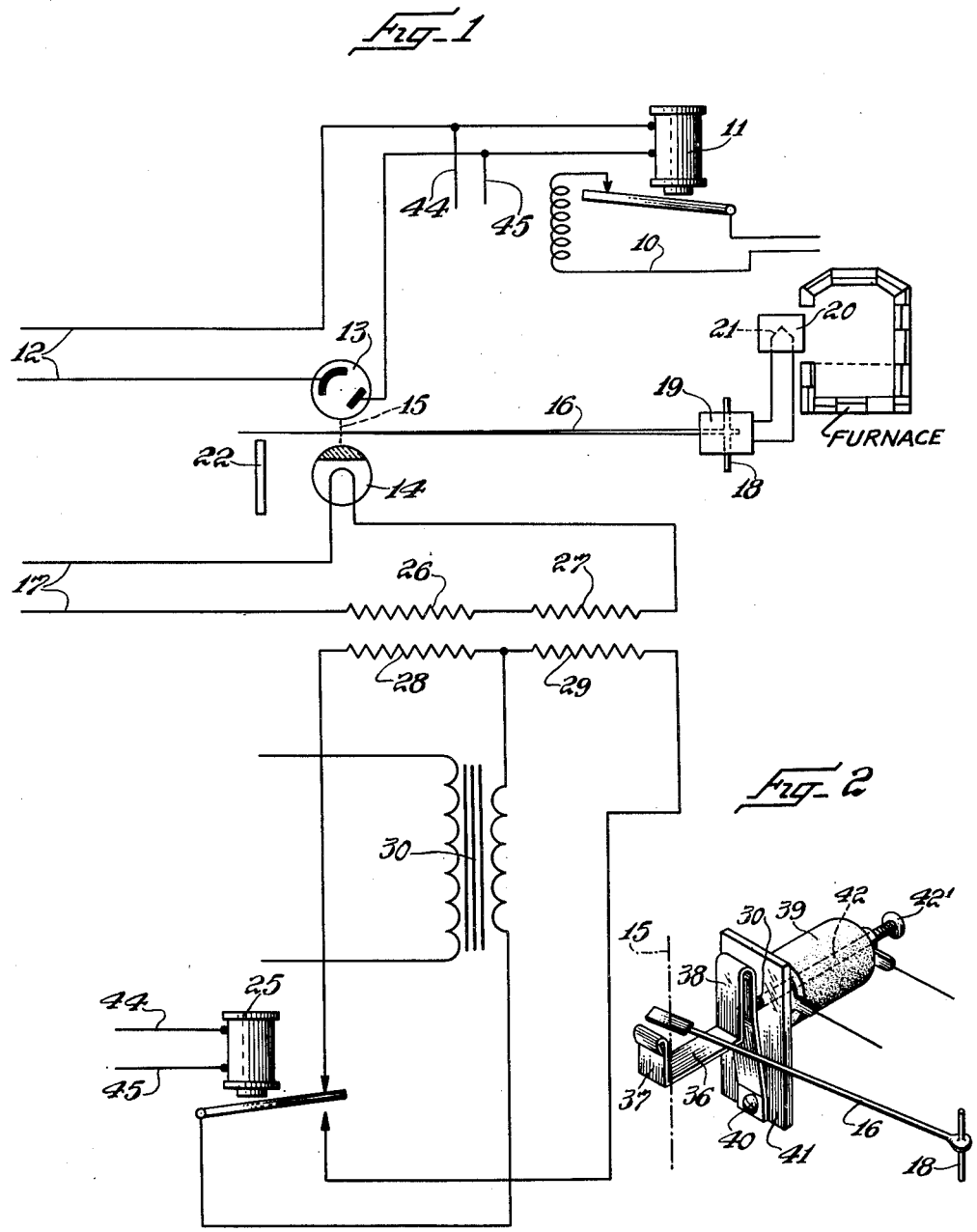

2,629,005

UNITED STATES PATENT OFFICE 2,629,005

SWITCH CONTROL MECHANISM

William E. Engelhard, North Arlington, N. J.

Application February 9, 1951, Serial No. 210,267

2 Claims. (Cl. 175—321)

This invention relates to a mechanism for the control of a switch or other electrical apparatus. It is particularly directed to such apparatus wherein a part, such as the switch designated in the accompanying drawing by reference character 11, is actuated on and off responsive to temperature or other predetermined condition reflected by a member such as is designated in the drawing by reference characters 20 and 16. This reference to the drawings is for the purpose only of facilitating an understanding of the invention, which is not limited to the specific examples shown in the drawings, as will become apparent from the description below.

One of the objectionable features of apparatus heretofore constructed was that the on-off actuation (as of the part 11) was not sufficiently responsive to minor changes of condition. The abrupt on-off effect, responsive to degree or other major condition change, resulted in appreciable time lags. This was objectionable as not permitting of control within fractional or very narrow ranges. The invention below described and illustrated in the accompanying drawings provides a smoothing out effect by automatically anticipating the on-off moments and accelerating them automatically, making the action smooth and continuous rather than abrupt and appreciably intermittent.

In the drawings:

Fig. 1 is a schematic view of a mechanism embodying the invention, and

Fig. 2 is a fragmentary perspective view of a mechanism adapted to be used in connection therewith.

As shown in the drawings, the apparatus to be controlled is generally designated by reference character 10 and may, for example, be the power circuit of an electric furnace or the like. The switch or other part to be controlled is designated by reference character 11 and responds to movement of the pointer or blocking member 16 which, in turn, reflects the condition at 20 in the apparatus, for example. Part 11 is actuated to one position on the normal flow of current through the switch circuit 12 to open or close power circuit 10.

The control mechanism of the present invention comprises a resistance unit 13 cut into switch circuit 12, and of such resistance value that it will decrease the passage of current through the switch circuit sufficient to preclude actuation of the switch to the position shown in Fig. 1. The resistance unit 13 may be electrically sensitized, however, by the sensitizing unit 14, to lower its resistance value and thus permit flow of current through circuit 12 sufficient to actuate switch 11. Sensitizing unit 14 is connected to a suitable power source 17 and is so juxtaposed relative to resistance unit 13 as to sensitize the latter while the space or path 15 between the units is clear.

The apparatus includes a blocking member 16, which may be a pointer registering on scale 22, for example, said pointer being pivoted as at 18 and being moved by a member 19 (which may be an electro-magnet or other mechanism) responsive to the condition, such as heat, at a point in the apparatus, marked 20, this condition being reflected to actuate member 19 through a responsive device such as indicated by the thermocouple 21. The pointer 16 will move on its pivot 18 and when it reaches the predetermined point at which it is desired to discontinue the flow of current through the apparatus circuit 10, it will be disposed in space 15 between units 13, 14, interrupting the action of sensitizing unit 14 on resistance unit 13. The units 13 and 14 might be movable or preset to such position along the scale 22, for example, as will indicate a maximum or other desired range, the attainment of which would be marked by the pointer or blocking member 16 moving into space 15 between the units 13, 14. Disposition of member 16 in space 15 will permit resistance unit 13 to exert its resistance value which will, in turn, decrease the passage of current to the switch 11, opening the switch and thus also the circuit 10. The effect of the opening of circuit 10 will be to permit the apparatus being controlled, such as an electric furnace, for example, to return to the desired condition. For example, it will permit a drop in temperature resulting from discontinuance of the flow of current through the apparatus power circuit 10 and this, in turn, will, through the reflecting unit 20 and member 19, move pointer 16 out of space 15 between units 13, 14. Thereupon, the unit 14 will sensitize the resistance unit 13, permitting the flow of current to be resumed through circuit 12 and through switch 11 to close the switch and thus also the power circuit 10 for the apparatus.

It will be obvious that the cycle described will be automatically repeated again and again. The mechanism of the instant invention accelerates the on-off time by anticipating movement of the blocking member 16 into and out of space 15 between units 13, 14.

This anticipating effect is obtained by a mechanism which subtracts from the current value of circuit 17 for sensitizing unit 14 when pointer 16 is out of the space 15 and adds to the current value of circuit 17 when member 16 is in space 15. Thus, the moment of restoration of flow of sufficient current through unit 14 on retraction of blocking member 16 from path 15 will be expedited, as will also the moment of drop of current on return of blocking member 16 to path 15. The effect attained by the present invention, therefore, is to accelerate the on-and-off moments of current through apparatus 10 to be controlled. The practical effect is to make it possible to control such apparatus within a fraction of a degree of temperature variation—where that is the condition to be controlled. The mechanism comprises a pair of thermal resistance elements 26, 27, the former having a positive temperature coefficient, the latter a negative coefficient, said elements being arranged in series in power circuit 17 of sensitizing unit 14 and being selectively actuated by means, including a switch 25, responsive to the condition of circuit 12 for switch 11, which, in turn, reflects the position of blocking member 16 relative to units 13, 14.

The elements 26, 27 have positive and negative temperature coefficients only when thermally actuated. Elements 26, 27 being opposed, neutralize the effect of room temperature and room temperature changes. Elements 26, 27 are actuated, as shown in the drawings, by heating elements 28, 29, which are selectively controlled by switch 25. The resistance value of each element 26, 27 is such fractional part of the resistance value of circuit 17 for unit 14 that the latter will receive adequate current through circuit 17 to actuate the same for its intended purpose, notwithstanding the effect of the positive coefficient resistance element. Its effect is to accelerate the moment the intensity of current through circuit 17 will become insufficient for the purpose mentioned.

Pointer 16 approaches the space 15 while the flow of current through circuit 12 closes circuit 10 and energizes relay 25 to connect heating element 28 to power source 30 and thermally energize the positive coefficient resistance element—as 26, for example. When pointer 16 cuts into space 15 between units 13, 14, it will open circuit 10 at an earlier moment than it would have done if element 26 was not then operative to reduce the intensity of current flowing through unit 14. Likewise, the other (negative coefficient) resistance element, as 27, is energized while there is blockage of space 15 sufficient to affect circuit 12 (which condition of circuit 12 affects relay 25 connected thereto by leads 44, 45) moving the relay 25 to its other position to actuate element 29, heating and thus activating element 27. The effect of thermally activated element 27 (negative coefficient element) is to add to the intensity of current flowing through sensitizing unit 14 while the pointer is in the path 15, brightening bulb 14. Unit 14 will thus attain the intensity of current required to exert a sensitizing effect on unit 13 at a sooner moment of withdrawal of pointer 16 from path 15.

The heating elements 28, 29 are connected to a suitable power source 30, as, for example, a transformer or the like; the transformer, in turn, may be connected to a power source and to elements 28, 29 selectively through switch 25 above described.

As will be appreciated, therefore, the action of the mechanism of the present invention is one of anticipating the condition at 20 so that a smoother control of the electrical part 10 to be controlled is attained, the on-off connection of parts 10, 12 being effected within a much lesser range of fluctuation of condition than would otherwise be possible.

Fig. 2 is a perspective view illustrating a mechanism which may be used to preclude excessive movement of pointer 16, comprising a guide 36 having upstanding walls 37, 38, to limit the extremes of movement of the pointer or blocking member 16 into and out of the path or space 15 between units 13, 14. The member 36 is preferably made of flexible metallic or similar material, bent to the shape shown in Fig. 2. It has been found that with the use of a guide 36, electrostatic charges cause adherence of pointer 16 to wall 37 or 38. The pointer 16 is finely balanced so as to move responsive to very slight exertion of power. It will tend to remain stuck to wall 37 or 38 by virtue of the electrostatic charges. Another feature of the present invention is to provide means for vibrating the guide 36 to preclude sticking of pointer 16 to a wall of guide 36. This end is attained by mounting the guide 36 rigidly as at 40 on a support 41 in a fashion which will permit a slight amount of independent movement of guide 36 relative to said support 41 and mounting an electromagnet 39 on the support 41 to vibrate guide 36 in the fashion of an armature. Mechanism 39 has a core or pin 42 passing through support 41 and spaced as at 30 from the guide 36 so that on flow of alternating current through mechanism 39 a magnetic field will be set up which will vibrate guide 36. The member 39 may be a resistance coil or other unit connected to an alternating current power source; for example, it may be cut into circuit 17 to lower the value thereof. This has been found of practical value in prolonging the useful life of a bulb 14; it may be connected to another power source. Guide 36 is preferably made of magnetic material, such as pure nickel, the intensity of its vibration depending on the intensity of magnetic field set up at 30, in turn depending on the spacing of the end of core pin 42 from member 36 at 30. Adjustment of that spacing is attained by rotating the pin as at the end 42' thereof so as to prevent such harsh vibration as would whip the pointer 16 from one wall of guide 36 to another.

In the specific form shown in the drawings, resistance unit 13 is a photoelectric cell and sensitizing unit 14 is an incandescent bulb having a lens which will focus its light in the form of a beam 15 onto unit 13. It will be apparent that resistance unit 13 may be any other type of resistance unit affected by a sensitizing unit juxtaposed to mark a space line 15 between units 13, 14, sensitizing action of unit 14 on unit 13 being effective only while said space 15 is uninterrupted. The specific circuit wiring arrangements may be varied as required by the job at hand. It will also be apparent that in place of relays 11 and 25, other switch mechanisms suitable to the same end and well known in this art may be substituted. Likewise, the action of the relays may be the reverse of that above described, to suit specific applications, as, for example, to normally open the circuit of apparatus 10 and to close the same only upon the occurrence of a condition at 20.

Having thus described my invention, what I claim as new and desire to secure by Letters Patent is:

1. A control system for making and breaking the electrical circuit to a device experiencing fluctuations in energy level, which comprises a main switch, an electromagnet for controlling said switch adapted to be affected by a predetermined intensity of current supplied thereto, a feed circuit connected to said electromagnet and including a light-responsive resistance unit, a light source in alignment with said unit, means for converting predetermined differences in energy level of said device to mechanical translating movements and a movable blocking member between said unit and light source operated by said converting means, an auxiliary circuit for energizing said light source and including resistors of positive and negative temperature coefficients, selectively operable heating means for said resistors alternately operable by a switching device controlled by the intensity of current in said feed circuit to decrease the current in said auxiliary circuit when said feed circuit has closed said main switch and to increase the current in said auxiliary circuit when said feed circuit has opened said main switch, whereby said light source and light responsive resistance unit accelerates the action of said electromagnet in its alternate control of said main switch.

2. An apparatus as set forth in claim 1, wherein the resistance value of the resistors of positive and negative temperature coefficients in the auxiliary circuit constitute only a fractional part of the resistance of said auxiliary circuit.

WILLIAM E. ENGELHARD.

REFERENCES CITED

The following references are of record in the file of this patent:

UNITED STATES PATENTS

| Number | Name | Date |
| --- | --- | --- |
| 1,685,995 | Gano | Oct. 2, 1928 |
| 1,930,496 | Wilson | Oct. 17, 1933 |
| 2,148,491 | Moore | Feb. 28, 1939 |
| 2,187,613 | Nichols | Jan. 16, 1940 |
| 2,205,777 | Fairchild | June 25, 1940 |
| 2,302,320 | Hintze | Nov. 17, 1942 |
| 2,471,457 | Shepard | May 31, 1949 |

FOREIGN PATENTS

| Number | Country | Date |
| --- | --- | --- |
| 640,150 | Germany | Dec. 23, 1936 |